United States Patent
Chen et al.

(10) Patent No.: US 9,716,605 B2
(45) Date of Patent: Jul. 25, 2017

(54) SCRAMBLING METHOD AND SCRAMBLING APPARATUS

(71) Applicant: Huawei Technologies Co., Ltd., Shenzhen (CN)

(72) Inventors: Zhiqiang Chen, Beijing (CN); Tongtong Wang, Beijing (CN); Changsong Li, Shenzhen (CN); Zhijun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/199,707

(22) Filed: Jun. 30, 2016

(65) Prior Publication Data

US 2016/0315793 A1   Oct. 27, 2016

Related U.S. Application Data

(63) Continuation of application No. PCT/CN2013/091126, filed on Dec. 31, 2013.

(51) Int. Cl.
*H04B 1/66* (2006.01)
*H04L 25/03* (2006.01)
*H04L 5/00* (2006.01)

(52) U.S. Cl.
CPC ...... *H04L 25/03866* (2013.01); *H04L 5/0064* (2013.01)

(58) Field of Classification Search
CPC ... H04L 12/12; H04L 69/24; H04L 25/03866; H04L 27/2627; H04B 1/7097

(Continued)

(56) References Cited

U.S. PATENT DOCUMENTS

| 4,744,104 A | 5/1988 | Pospischil |
| 4,807,290 A | 2/1989 | Pospischil |

(Continued)

FOREIGN PATENT DOCUMENTS

| CN | 101098299 A1 | 1/2008 |
| CN | 102932100 A | 2/2012 |

(Continued)

OTHER PUBLICATIONS 802.3-1985 "IEEE Standards for Local Area Networks: Part 3: Carrier Sense Multiple Access With Collision Detection (CSMA/CD) Access Method and Physical Layer Specifications," Section Four, Jun. 22, 2010; 4 pages.

(Continued)

*Primary Examiner* — Khai Tran
(74) *Attorney, Agent, or Firm* — Slater Matsil, LLP

(57) ABSTRACT

In a scenario of a flexible Ethernet, the number of Ethernet frame streams received by an Ethernet interface of a receiver and a bit width of each Ethernet frame stream may need to be adjusted. A corresponding scrambling circuit is disposed for each data segment in the Ethernet frame streams, so as to separately perform scrambling on each data segment, where the number of bits of each data segment is M. Furthermore, X scrambling circuits corresponding to X data segments in a first Ethernet frame stream may separately calculate scrambling results of the X data segments. Therefore, if an adjusted bit width of each Ethernet frame stream is an integral multiple of M, a corresponding number of scrambling circuits may be reconfigured to perform scrambling on each adjusted Ethernet frame stream.

17 Claims, 8 Drawing Sheets

(58) Field of Classification Search
USPC .......... 375/240, 240.27, 299; 370/230, 465
See application file for complete search history.

(56) References Cited

U.S. PATENT DOCUMENTS

| | | | |
|---|---|---|---|
| 7,269,778 B1 * | 9/2007 | Feng | H03M 5/145 |
| | | | 341/59 |
| 2003/0044005 A1 | 3/2003 | Lee et al. | |
| 2003/0123389 A1 * | 7/2003 | Russell | G06F 11/273 |
| | | | 370/230 |
| 2004/0062397 A1 * | 4/2004 | Amer | H04L 25/03872 |
| | | | 380/268 |
| 2009/0028331 A1 * | 1/2009 | Millar | H04N 7/17318 |
| | | | 380/255 |
| 2010/0202556 A1 | 8/2010 | Chiabrera | |

FOREIGN PATENT DOCUMENTS

| | | |
|---|---|---|
| CN | 102694709 A | 9/2012 |
| EP | 3043497 A1 | 7/2016 |

OTHER PUBLICATIONS

Toyoda, H et al., "100Gbe PHY and MAC Layer Implementations," 100 Gigabit Ethernet Transport, IEEE Communication Magazine, Mar. 2010, 8 pages.

\* cited by examiner

SCRAMBLING METHOD AND SCRAMBLING APPARATUS

CROSS-REFERENCE TO RELATED APPLICATIONS

This application is a continuation of International Application No. PCT/CN2013/091126, filed on Dec. 31, 2013, which is hereby incorporated by reference in its entirety.

TECHNICAL FIELD

The present disclosure relates to the communications field, and in particular embodiments, to a scrambling method and a scrambling apparatus.

BACKGROUND

As Ethernet technologies evolve, currently there is a requirement that interface bandwidth and the number of streams can be configured flexibly.

A bandwidth-flexible Ethernet may implement, in the case of total interface bandwidth, flexible configuration of the number of Ethernet frame streams and bandwidth of an Ethernet frame stream. The Ethernet frame stream is also referred to as sub Media Access Control MAC for short) stream. For example, channel resources originally belonging to a fixed 400 gigabit Ethernet (GE for short) interface may be used to bear traffic of one 400 GE, one 300 GE+one 100 GE, two 200 GE, four 100 GE, eight 50 GE, or sixteen 25 GE.

In the prior art, bandwidth of an Ethernet interface of a receiver is fixed. The bandwidth may also be referred to as rate. For example, a rate of a 100 GE interface is 100 gigabit per second, and a rate of a 40 GE interface is 40 gigabit per second. After receiving a data stream, the Ethernet interface of the receiver performs scrambling on the data stream by using a scrambler. The number of bits of a data stream that can be scrambled by a scrambler in each clock cycle is a fixed value. The foregoing technical solutions are difficult to be applied to a scenario of a flexible Ethernet.

SUMMARY

Embodiments of the present invention provide a scrambling method and a scrambling apparatus, which are used to implement data scrambling for a flexible Ethernet.

According to a first aspect, a scrambling method is provided, including the following.

Receiving Ethernet frame streams in a first clock cycle;
obtaining X data segments, where the X data segments are data segments of a first Ethernet frame stream in the first clock cycle, the number of bits of each data segment in the X data segments is M, M is an integer greater than 1, and X is a positive integer; and obtaining Y data segments, where the Y data segments are data segments of a second Ethernet frame stream in the first clock cycle, the number of bits of each data segment in the Y data segments is M, and Y is a positive integer.

The method further includes separately distributing X pieces of input data to X scrambling circuits, where the X scrambling circuits are in a one-to-one correspondence with the X pieces of input data;

separately distributing Y pieces of input data to Y scrambling circuits, where the Y scrambling circuits are in a one-to-one correspondence with the Y pieces of input data;

calculating concurrently, by the X scrambling circuits, scrambling results of the X data segments according to a scrambling polynomial and by separately using the X pieces of input data, where the X data segments are in a one-to-one correspondence with the X scrambling circuits, and each scrambling circuit of the X scrambling circuits is configured to calculate concurrently a scrambling result of a binary sequence in which the number of bits is M; and calculating concurrently, by the Y scrambling circuits, scrambling results of the Y data segments according to the scrambling polynomial and by separately using the Y pieces of input data, where the Y data segments are in a one-to-one correspondence with the Y scrambling circuits, and each scrambling circuit of the Y scrambling circuits is configured to calculate concurrently a scrambling result of a binary sequence in which the number of bits is M.

With reference to the first aspect, in an implementation, the X data segments include the first data segment to the $X^{th}$ data segment, and a sequential order of locations of the X data segments borne in the first Ethernet frame stream in the first clock cycle is the first data segment to the $X^{th}$ data segment successively.

The separately distributing X pieces of input data to X scrambling circuits includes: distributing the $a^{th}$ input data to the $a^{th}$ scrambling circuit, where values of a are integers from 1 to X.

The distributing the $a^{th}$ input data to the $a^{th}$ scrambling circuit includes:

distributing first data and second data to a first calculation circuit and a second calculation circuit respectively, where the $a^{th}$ input data includes the first data and the second data, the $a^{th}$ scrambling circuit includes the first calculation circuit, the second calculation circuit, and a third calculation circuit, the first data includes the first data segment to the $a^{th}$ data segment, and the second data includes the last N bits in a scrambling result of a first Ethernet frame stream in a second clock cycle, where N is a degree of the scrambling polynomial, and the second clock cycle is a clock cycle immediately before the first clock cycle.

The calculating concurrently, by the X scrambling circuits, scrambling results of the X data segments according to a scrambling polynomial and by separately using the X pieces of input data includes: calculating concurrently, by the $a^{th}$ scrambling circuit, a scrambling result of the $a^{th}$ data segment according to the scrambling polynomial and by using the $a^{th}$ input data.

The calculating concurrently, by the $a^{th}$ scrambling circuit, a scrambling result of the $a^{th}$ data segment according to the scrambling polynomial and by using the $a^{th}$ input data includes:

performing, by the first calculation circuit, an exclusive OR calculation on all related bits of each bit of the $a^{th}$ data segment in the first data, so as to obtain a first result of each bit of the $a^{th}$ data segment;

performing, by the second calculation circuit, an exclusive OR calculation on all related bits of each bit of the $a^{th}$ data segment in the second data, so as to obtain a second result of each bit of the $a^{th}$ data segment; and performing, by the third calculation circuit, an exclusive OR calculation on the first result and the second result that are of each bit of the $a^{th}$ data segment, so as to obtain the scrambling result of each bit of the $a^{th}$ data segment.

With reference to the first aspect, in an implementation, the Y data segments include the $(X+1)^{th}$ data segment to the $(X+Y)^{th}$ data segment, and a sequential order of locations of the Y data segments borne in the second Ethernet frame stream in the first clock cycle is the $(X+1)^{th}$ data segment to the $(X+Y)^{th}$ data segment successively.

The separately distributing Y pieces of input data to Y scrambling circuits includes: distributing the $(X+b)^{th}$ input data to the $(X+b)^{th}$ scrambling circuit, where a value of b is an integer from 1 to Y.

The distributing the $(X+b)^{th}$ input data to the $(X+b)^{th}$ scrambling circuit includes:

distribute third data and fourth data to a fourth calculation circuit and a fifth calculation circuit respectively, where the $(X+b)^{th}$ input data includes the third data and the fourth data, the $(X+b)^{th}$ scrambling circuit includes the fourth calculation circuit, the fifth calculation circuit, and a sixth calculation circuit, the third data includes the $(X+1)^{th}$ data segment to the $(X+b)^{th}$ data segment, and the fourth data includes the last N bits of a scrambling result of a second Ethernet frame stream in the second clock cycle.

The calculating concurrently, by the Y scrambling circuits, scrambling results of the Y data segments according to the scrambling polynomial and by separately using the Y pieces of input data includes: calculating concurrently, by the $(X+b)^{th}$ scrambling circuit, a scrambling result of the $(X+b)^{th}$ data segment according to the scrambling polynomial and by using the $(X+b)^{th}$ input data.

The calculating concurrently, by the $(X+b)^{th}$ scrambling circuit, a scrambling result of the $(X+b)^{th}$ data segment according to the scrambling polynomial and by using the $(X+b)^{th}$ input data includes:

performing, by the fourth calculation circuit, an exclusive OR calculation on all related bits of each bit of the $(X+b)^{th}$ data segment in the third data, so as to obtain a first result of each bit of the $(X+b)^{th}$ data segment;

performing, by the fifth calculation circuit, an exclusive OR calculation on all related bits of each bit of the $(X+b)^{th}$ data segment in the fourth data, so as to obtain a second result of each bit of the $(X+b)^{th}$ data segment; and performing, by the sixth calculation circuit, an exclusive OR calculation on the first result and the second result that are of each bit of the $(X+b)^{th}$ data segment, so as to obtain the scrambling result of each bit of the $(X+b)^{th}$ data segment.

In an implementation of the first aspect, the number of bits included in the third data is $(X+b) \times M$, high order $b \times M$ bits of the third data is equal to a first binary sequence, the first binary sequence includes b data segments, and a sequential order, in the first binary sequence, of the b data segments is the $(X+1)^{th}$ data segment to the $(X+b)^{th}$ data segment successively.

In an implementation of the first aspect, the Y data segments are separately corresponding to Y pieces of information, and the Y pieces of information are used to indicate that the Y data segments belong to the second Ethernet frame stream, and are used to indicate a location, in the second Ethernet frame stream, of each data segment in the Y data segments.

In this implementation, the distributing third data to a fourth calculation circuit specifically includes:

obtaining, according to the Y pieces of information, the second Ethernet frame stream from the received Ethernet frame streams in the first clock cycle, where the second Ethernet frame stream includes the Y data segments; and distributing the second Ethernet frame stream to the fourth calculation circuit.

In an implementation of the first aspect, the X data segments are separately corresponding to X pieces of information, and the X pieces of information are used to indicate that the X data segments belong to the first Ethernet frame stream, and are used to indicate a location, in the first Ethernet frame stream, of each data segment in the X data segments.

In this implementation, the distributing first data to a first calculation circuit includes:

obtaining, according to the X pieces of information, the first Ethernet frame stream from the received Ethernet frame streams in the first clock cycle, where the first Ethernet frame stream includes the X data segments; and distributing the first Ethernet frame stream to the first calculation circuit.

In an implementation of the first aspect, the first information to the $X^{th}$ information in the X pieces of information are corresponding to the first data segment to the $X^{th}$ data segment respectively, and the $X^{th}$ information is further used to indicate that the $X^{th}$ data segment is the last data segment in the first Ethernet frame stream.

In this implementation, the method further includes:

saving a scrambling result of the first Ethernet frame stream in the first clock cycle according to the $X^{th}$ information.

According to a second aspect, a scrambling apparatus is provided. The scrambling apparatus includes the following.

A receiving unit configured to receive Ethernet frame streams in a first clock cycle.

A first obtaining unit configured to obtain X data segments from the Ethernet frame streams in the first clock cycle that are received by the receiving unit, where the X data segments are data segments of a first Ethernet frame stream in the first clock cycle, the number of bits of each data segment in the X data segments is M, M is an integer greater than 1, and X is a positive integer.

A second obtaining unit configured to obtain Y data segments from the Ethernet frame streams in the first clock cycle that are received by the receiving unit, where the Y data segments are data segments of a second Ethernet frame stream in the first clock cycle, the number of bits of each data segment in the Y data segments is M, and Y is a positive integer.

A first distribution unit configured to separately distribute X pieces of input data to X scrambling circuits, where the X scrambling circuits are in a one-to-one correspondence with the X pieces of input data.

A second distribution unit configured to separately distribute Y pieces of input data to Y scrambling circuits, where the Y scrambling circuits are in a one-to-one correspondence with the Y pieces of input data.

In the second aspect, the X scrambling circuits are configured to calculate concurrently scrambling results of the X data segments according to a scrambling polynomial and by separately using the X pieces of input data distributed by the first distribution unit, where the X data segments are in a one-to-one correspondence with the X scrambling circuits, and each scrambling circuit of the X scrambling circuits is configured to calculate concurrently a scrambling result of a binary sequence in which the number of bits is M.

The Y scrambling circuits, configured to calculate concurrently scrambling results of the Y data segments according to the scrambling polynomial and by separately using the Y pieces of input data distributed by the second distribution unit, where the Y data segments are in a one-to-one correspondence with the Y scrambling circuits, and each scrambling circuit of the Y scrambling circuits is configured to calculate concurrently a scrambling result of a binary sequence in which the number of bits is M.

With reference to the second aspect, in an implementation, the X data segments include the first data segment to the $X^{th}$ data segment, and a sequential order of locations of the X data segments borne in the first Ethernet frame stream in the first clock cycle is the first data segment to the $X^{th}$ data segment successively. The first distribution unit is configured to distribute the $a^{th}$ input data to the $a^{th}$ scrambling circuit, where values of a are integers from 1 to X.

The first distribution unit is configured to distribute first data and second data to a first calculation circuit and a second calculation circuit respectively, where the $a^{th}$ input data includes the first data and the second data, the $a^{th}$ scrambling circuit includes the first calculation circuit, the second calculation circuit, and a third calculation circuit, the first data includes the first data segment to the $a^{th}$ data segment, and the second data includes the last N bits in a scrambling result of a first Ethernet frame stream in a second clock cycle, where N is a degree of the scrambling polynomial, and the second clock cycle is a clock cycle immediately before the first clock cycle.

The X scrambling circuits includes the $a^{th}$ scrambling circuit, and the $a^{th}$ scrambling circuit is configured to calculate concurrently a scrambling result of the $a^{th}$ data segment according to the scrambling polynomial and by using the $a^{th}$ input data, where:

the first calculation circuit is configured to perform an exclusive OR calculation on all related bits of each bit of the $a^{th}$ data segment in the first data, so as to obtain a first result of each bit of the $a^{th}$ data segment;

the second calculation circuit is configured to perform an exclusive OR calculation on all related bits of each bit of the $a^{th}$ data segment in the second data, so as to obtain a second result of each bit of the $a^{th}$ data segment; and the third calculation circuit is configured to perform an exclusive OR calculation on the first result and the second result that are of each bit of the $a^{th}$ data segment, so as to obtain the scrambling result of each bit of the $a^{th}$ data segment.

With reference to the second aspect, in an implementation, the Y data segments include the $(X+1)^{th}$ data segment to the $(X+Y)^{th}$ data segment, and a sequential order of locations of the Y data segments borne in the second Ethernet frame stream in the first clock cycle is the $(X+1)^{th}$ data segment to the $(X+Y)^{th}$ data segment successively.

Furthermore, the second distribution unit is configured to distribute the $(X+b)^{th}$ input data to the $(X+b)^{th}$ scrambling circuit, where a value of b is an integer from 1 to Y.

The second distribution unit is configured to distribute third data and fourth data to a fourth calculation circuit and a fifth calculation circuit respectively, where the $(X+b)^{th}$ input data includes the third data and the fourth data, the $(X+b)^{th}$ scrambling circuit includes the fourth calculation circuit, the fifth calculation circuit, and a sixth calculation circuit, the third data includes the $(X+1)^{th}$ data segment to the $(X+b)^{th}$ data segment, and the fourth data includes the last N bits of a scrambling result of a second Ethernet frame stream in the second clock cycle.

The Y scrambling circuits includes the $(X+b)^{th}$ scrambling circuit, and the $(X+b)^{th}$ scrambling circuit is configured to calculate concurrently a scrambling result of the $(X+b)^{th}$ data segment according to the scrambling polynomial and by using the $(X+b)^{th}$ input data, where:

the fourth calculation circuit is configured to perform an exclusive OR calculation on all related bits of each bit of the $(X+b)^{th}$ data segment in the third data, so as to obtain a first result of each bit of the $(X+b)^{th}$ data segment;

the fifth calculation circuit is configured to perform an exclusive OR calculation on all related bits of each bit of the $(X+b)^{th}$ data segment in the fourth data, so as to obtain a second result of each bit of the $(X+b)^{th}$ data segment; and the sixth calculation circuit is configured to perform an exclusive OR calculation on the first result and the second result that are of each bit of the $(X+b)^{th}$ data segment, so as to obtain the scrambling result of each bit of the $(X+b)^{th}$ data segment.

With reference to the second aspect, in an implementation, the number of bits included in the third data is $(X+b) \times M$, where high order $b \times M$ bits of the third data is equal to a first binary sequence, where the first binary sequence includes b data segments, and a sequential order, in the first binary sequence, of the b data segments is the $(X+1)^{th}$ data segment to the $(X+b)^{th}$ data segment successively. With reference to the second aspect, in an implementation, the Y data segments are separately corresponding to Y pieces of information, and the Y pieces of information are used to indicate that the Y data segments belong to the second Ethernet frame stream, and are used to indicate a location, in the second Ethernet frame stream, of each data segment in the Y data segments.

Furthermore, the second distribution unit is configured to: obtain, according to the Y pieces of information, the second Ethernet frame stream from the received Ethernet frame streams in the first clock cycle, where the second Ethernet frame stream includes the Y data segments; and distribute the second Ethernet frame stream to the fourth calculation circuit.

With reference to the second aspect, in an implementation, the X data segments are separately corresponding to X pieces of information, and the X pieces of information are used to indicate that the X data segments belong to the first Ethernet frame stream, and are used to indicate a location, in the first Ethernet frame stream, of each data segment in the X data segments.

The first distribution unit is configured to: obtain, according to the X pieces of information, the first Ethernet frame stream from the received Ethernet frame streams in the first clock cycle, where the first Ethernet frame stream includes the Y data segments; and distribute the first Ethernet frame stream to the first calculation circuit.

With reference to the second aspect, in an implementation, the first information to the $X^{th}$ information in the X pieces of information are corresponding to the first data segment to the $X^{th}$ data segment respectively, and the $X^{th}$ information is further used to indicate that the $X^{th}$ data segment is the last data segment in the first Ethernet frame stream.

The scrambling apparatus further includes:

a storage unit, configured to save a scrambling result of the first Ethernet frame stream in the first clock cycle according to the $X^{th}$ information.

According to a third aspect, an apparatus is provided, and the apparatus comprises one or more of the following:

a PHY, where the PHY may be implemented by using an FPGA or an ASIC; the PHY may be a part in a network interface card (NIC), where the NIC may be a line card or a PIC (physical interface card); and the PHY may include a Media-Independent Interface (MII) for interfacing to a MAC;

a PHY chip, where the PHY chip may include a plurality of PHYs; and the PHY chip may be implemented by using an FPGA or an ASIC;

a system chip, where the system chip may include a plurality of MACs and a plurality of PHYs; and the system chip may be implemented by using an FPGA or an ASIC; and a multi-port Ethernet device, where the multi-port Ethernet device may be an Ethernet hub, an Ethernet router, or an Ethernet switch; the multi-port Ethernet device includes a plurality of ports, where each port may include a system chip, and the system chip may include a MAC and a PHY; the multi-port Ethernet device may further integrate a plurality of MACs into one MAC chip, and integrate a plurality of PHYs into one PHY chip; and the multi-port Ethernet device may also integrate a plurality of MACs and a plurality of PHYs into one system chip.

The apparatus can execute the scrambling method provided in the first aspect or any one possible implementation manner of the first aspect.

The technical solutions provided in the foregoing embodiments of the present invention are easy to be applied to a scenario of a flexible Ethernet. Specifically, in the scenario of the flexible Ethernet, an Ethernet interface of a receiver may need to receive two Ethernet frame streams separately sent by two Ethernet interfaces. The technical solutions provided in this embodiments of the present invention may separately perform scrambling for the two Ethernet frame streams.

In a scenario of a flexible Ethernet, the number of Ethernet frame streams received by an Ethernet interface of a receiver and a bit width of each Ethernet frame stream may need to be adjusted. In the technical solutions of the embodiment of the present invention, X scrambling circuits may separately calculate scrambling results of X data segments, Y scrambling circuits may separately calculate scrambling results of Y data segments, and the number of bits included in any data segment in the X data segments is equal to the number (M) of bits included in any data segment in the Y data segments. Therefore, if an adjusted bit width of each Ethernet frame stream is an integral multiple of M, and the bit width of the Ethernet frame stream is less than or equal to (X+Y)×M, the X scrambling circuits and the Y scrambling circuits may be reconfigured to perform scrambling on each adjusted Ethernet frame stream.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present disclosure clearer, the following further describes the present disclosure in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present disclosure.

The technical solutions provided in the embodiments of the present invention are easy to be applied to a scenario of a flexible Ethernet. Specifically, in the scenario of the flexible Ethernet, an Ethernet interface of a receiver may need to receive two Ethernet frame streams separately sent by two Ethernet interfaces. The technical solutions provided in the present disclosure may perform scrambling separately for the two Ethernet frame streams.

The embodiments of the present invention may be implemented in a PCS (Physical Coding Sublayer) at a physical layer in an open system interconnect reference model. The physical layer may include an RS (Reconciliation Sublayer), a PCS sublayer, a PMA (Physical Medium Attachment) sublayer, and a PMD (Physical Media Dependent) sublayer. In an application scenario of a bandwidth-flexible Ethernet, after data that is coded by a coding module at the PCS sublayer is distributed into a plurality of Ethernet frame streams (for example, sub MAC streams) by a MAC distributing module, each Ethernet frame stream is separately scrambled at an aggregation layer.

Figure 1:
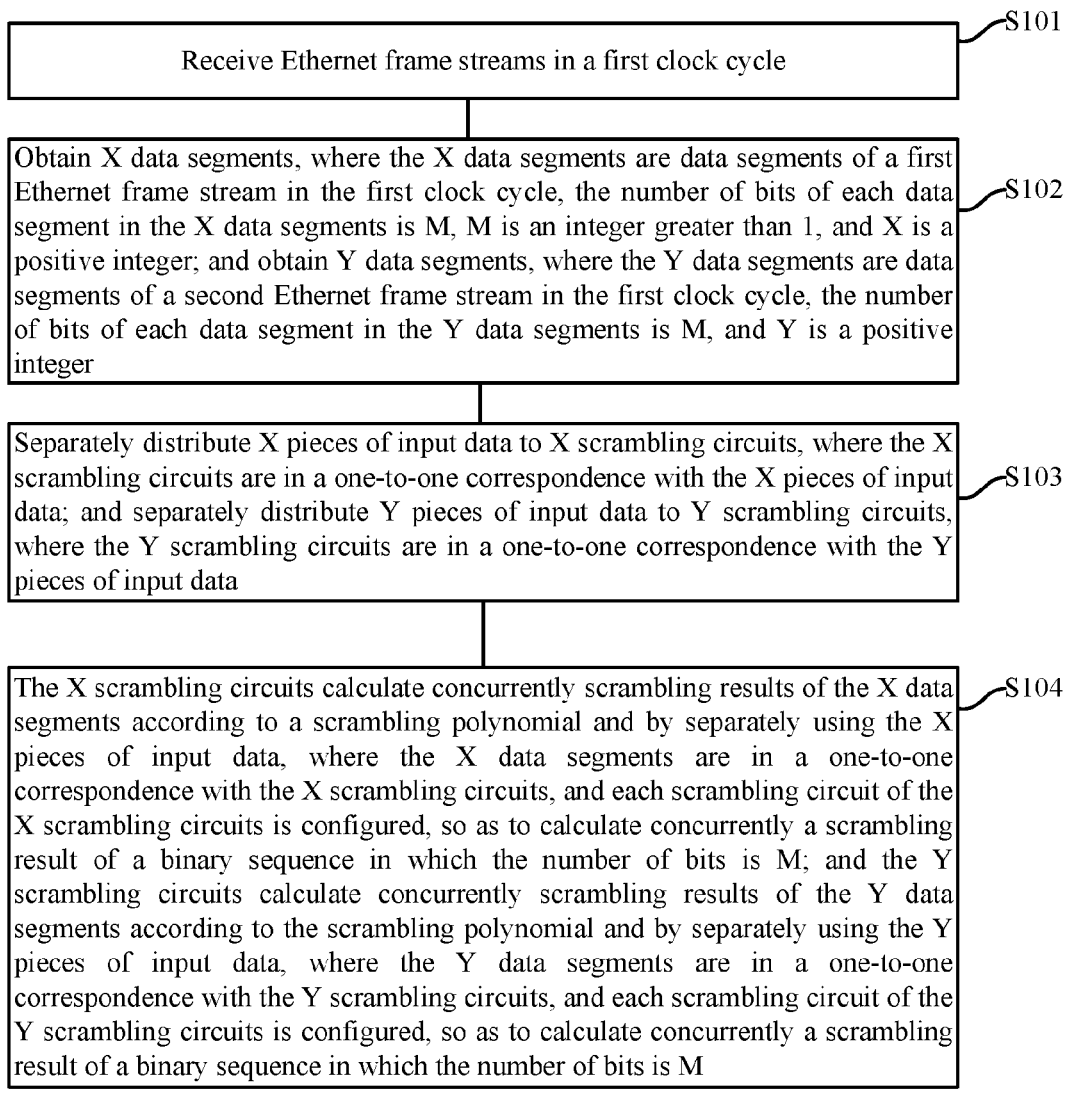
FIG. 1 is a schematic diagram of a scrambling method according to an embodiment of the present invention.

FIG. 1 is a schematic diagram of a scrambling method according to an embodiment of the present invention. The scrambling method is described by using an example in which an Ethernet interface of a receiver separately receives two Ethernet frame streams within one clock cycle. The method may be performed by a receiver of a network apparatus. The receiver may include an Ethernet interface. The receiver may be implemented by using an application-specific integrated circuit (ASIC for short) or a field programmable gate array (FPGA for short). The network apparatus may be a router, a network switch, a firewall, a load balancer, a data center, a packet transport network (PTN for short) apparatus or a wavelength division multiplexing (WDM for short) apparatus. As shown in the figure, the scrambling method may include the following.

S101: Receive Ethernet frame streams in a first clock cycle.

For example, this embodiment is described by using an example in which the receiver receives the Ethernet frame streams by using the Ethernet interface. In one clock cycle (referred to as a first clock cycle), the receiver receives two Ethernet frame streams. For ease of description, the two Ethernet frame streams are referred to as a first Ethernet frame stream and a second Ethernet frame stream below.

For example, the Ethernet interface may include 10 serializer/deserializer (serdes for short). The ten serdes are separately the first serdes to the tenth serdes.

S102: Obtain X data segments, where the X data segments are data segments of a first Ethernet frame stream in the first clock cycle, where the number of bits of each data segment in the X data segments is M, and where M is an integer greater than 1 and X is a positive integer. The step S102 also includes obtaining Y data segments, where the Y data segments are data segments of a second Ethernet frame stream in the first clock cycle, where the number of bits of each data segment in the Y data segments is M, and where Y is a positive integer.

For example, the first Ethernet frame stream may be sent by a first transmitter by using the first serdes to the seventh serdes in the Ethernet interface, and the second Ethernet frame stream may be sent by a second transmitter by using the eighth serdes to the tenth serdes in the Ethernet interface. The first transmitter may be a transmitter of a first router. The second transmitter may be a transmitter of a second router. Alternatively, the first transmitter and the second transmitter may be two transmitters of a same router.

For example, the receiver may receive the X data segments within the first clock cycle by using the first serdes to the seventh serdes, and the receiver may receive the Y data segments within the first clock cycle by using the eighth serdes to the tenth serdes, where X is equal to 7, and Y is equal to 3.

In this embodiment, the first Ethernet frame stream includes the X data segments, the second Ethernet frame stream includes the Y data segments, and the number of bits of each data segment is M.

For the flexible Ethernet, bit widths of the Ethernet frame streams received by the receiver may be the same, or may be different. For example, bandwidth of an Ethernet interface corresponding to each Ethernet frame stream may be set according to a service requirement, and therefore, when a sub MAC stream (that is, an Ethernet frame stream) is distributed at a MAC sublayer, bit widths of a plurality of sub MAC streams after the distribution may be different. Therefore, X and Y in this embodiment may be the same, or may be different. A bit width of the first Ethernet frame stream is equal to X times M. A bit width of the second Ethernet frame stream is equal to Y times M. A rate of the first Ethernet frame stream is equal to the bit width of the first Ethernet frame stream times a receiving frequency of the receiver. A rate of the second Ethernet frame stream is equal to the bit width of the second Ethernet frame stream times the receiving frequency of the receiver.

The number of bits of each data segment may be related to a coding and decoding manner used by the flexible Ethernet. For example, when a 64b/66b coding and decoding manner is used, a 64-bit data block is a minimum granularity for data processing, and therefore, the number of bits of each data segment may be stipulated as 64. The numbers of data segments included in both the first Ethernet frame stream and the second Ethernet frame stream are positive integers.

Optionally, in S102, the data segments of the first Ethernet frame stream and the second Ethernet frame stream may be divided by a data segmentation module. The data segmentation module may be a logic circuit.

S103: Separately distribute X pieces of input data to X scrambling circuits, where the X scrambling circuits are in a one-to-one correspondence with the X pieces of input data. Step S103 also includes separately distribute Y pieces of input data to Y scrambling circuits, where the Y scrambling circuits are in a one-to-one correspondence with the Y pieces of input data.

The scrambling circuits are in a one-to-one correspondence with the data segments. Each scrambling circuit may include three calculation circuits. The input data sent to each scrambling circuit may be related to an Ethernet frame stream to which a data segment corresponding to the scrambling circuit belongs and to a location of the data segment in the Ethernet frame stream.

Optionally, in S103, corresponding input data may be input to each scrambling circuit by a distribution unit. The distribution unit may be a logic circuit.

S104: The X scrambling circuits calculate concurrently scrambling results of the X data segments according to a scrambling polynomial and by separately using the X pieces of input data, where the X data segments are in a one-to-one correspondence with the X scrambling circuits, and each scrambling circuit of the X scrambling circuits is configured to calculate concurrently a scrambling result of a binary sequence in which the number of bits is M. Additionally, the Y scrambling circuits calculate concurrently scrambling results of the Y data segments according to the scrambling polynomial and by separately using the Y pieces of input data, where the Y data segments are in a one-to-one correspondence with the Y scrambling circuits, and each scrambling circuit of the Y scrambling circuits is configured to calculate concurrently a scrambling result of a binary sequence in which the number of bits is M.

Each scrambling circuit uses a same scrambling polynomial to calculate a scrambling result of a corresponding data segment. This embodiment of the present invention sets no limitation on a scrambling polynomial used by a scrambling circuit.

The number of bits in the scrambling result output by each scrambling circuit is M, and the scrambling result is a scrambling result of each bit in a data segment corresponding to the scrambling circuit. The scrambling result output by each scrambling circuit is a binary sequence of the M bits.

Each scrambling circuit may calculate concurrently a scrambling result of a data segment corresponding to the scrambling circuit, and therefore, the scrambling result of each data segment may be obtained within one clock cycle, that is, a scrambling result of the first Ethernet frame stream and a scrambling result of the second Ethernet frame stream are obtained.

Optionally, a receiving rate, of the first Ethernet frame stream when the Ethernet frame streams are received, divided by a receiving rate of the second Ethernet frame stream when the Ethernet frame streams are received is equal to X divided by Y.

To describe more clearly, the following stipulations are made.

The X data segments include the first data segment to the $X^{th}$ data segment, and a sequential order of locations of the X data segments borne in the first Ethernet frame stream in the first clock cycle is the first data segment to the $X^{th}$ data segment successively. The Y data segments include the $(X+1)^{th}$ data segment to the $(X+Y)^{th}$ data segment, and a sequential order of locations of the Y data segments borne in the second Ethernet frame stream in the first clock cycle is the $(X+1)^{th}$ data segment to the $(X+Y)^{th}$ data segment.

The $a^{th}$ data segment is any data segment in the X data segments, and a scrambling circuit corresponding to the $a^{th}$ data segment is the $a^{th}$ scrambling circuit (that is, values of a are integers from 1 to X). The $a^{th}$ scrambling circuit includes a first calculation circuit, a second calculation circuit, and a third calculation circuit. Similarly, the $b^{th}$ data segment is any data segment in the Y data segments (that is, a value of b is an integer from 1 to Y), and a scrambling circuit corresponding to the $b^{th}$ data segment is the $b^{th}$ scrambling circuit. The $b^{th}$ scrambling circuit includes a fourth calculation circuit, a fifth calculation circuit, and a sixth calculation circuit.

According to the foregoing stipulations, the following describes implementations of S103 and S104 by using an example in which the $a^{th}$ input data is distributed to the $a^{th}$ scrambling circuit, and by using an example in which the $b^{th}$ input data is distributed to the $b^{th}$ scrambling circuit.

In S103, the distributing the $a^{th}$ input data to the $a^{th}$ scrambling circuit may include: distributing first data and second data to the first calculation circuit and the second calculation circuit respectively, where the $a^{th}$ input data includes the first data and the second data, the $a^{th}$ scrambling circuit includes the first calculation circuit, the second calculation circuit, and the third calculation circuit. The first data includes the first data segment to the $a^{th}$ data segment and the second data includes the last N bits in a scrambling result of a first Ethernet frame stream in a second clock cycle, where N is a degree of the scrambling polynomial, and where the second clock cycle is a clock cycle immediately before the first clock cycle.

In S104, the $a^{th}$ scrambling circuit calculates concurrently a scrambling result of the $a^{th}$ data segment according to the scrambling polynomial and by using the $a^{th}$ input data, and a specific implementation process thereof may include: performing, by the first calculation circuit, an exclusive OR calculation on all related bits of each bit of the $a^{th}$ data segment in the first data, so as to obtain a first result of each bit of the $a^{th}$ data segment. S104 also includes performing, by the second calculation circuit, an exclusive OR calculation on all related bits of each bit of the $a^{th}$ data segment in the second data, so as to obtain a second result of each bit of the $a^{th}$ data segment. S104 further includes performing, by the third calculation circuit, an exclusive OR calculation on the first result and the second result that are of each bit of the $a^{th}$ data segment, so as to obtain the scrambling result of each bit of the $a^{th}$ data segment.

Similarly, in S103, the distributing the $(X+b)^{th}$ input data to the $(X+b)^{th}$ scrambling circuit may include: distributing third data and fourth data to the fourth calculation circuit and the fifth calculation circuit respectively, where the $(X+b)^{th}$ input data includes the third data and the fourth data. The $(X+b)^{th}$ scrambling circuit includes the fourth calculation circuit, the fifth calculation circuit, and the sixth calculation circuit, while the third data includes the $(X+1)^{th}$ data segment to the $(X+b)^{th}$ data segment, and the fourth data includes the last N bits of a scrambling result of a second Ethernet frame stream in the second clock cycle.

In S104, the $(X+b)^{th}$ scrambling circuit calculates concurrently a scrambling result of the $(X+b)^{th}$ data segment according to the scrambling polynomial and by using the $(X+b)^{th}$ input data. A specific implementation process thereof may include: performing, by the fourth calculation circuit, an exclusive OR calculation on all related bits of each bit of the $(X+b)^{th}$ data segment in the third data, so as to obtain a first result of each bit of the $(X+b)^{th}$ data segment This implementation also includes performing, by the fifth calculation circuit, an exclusive OR calculation on all related bits of each bit of the $(X+b)^{th}$ data segment in the fourth data, so as to obtain a second result of each bit of the $(X+b)^{th}$ data segment. This implementation further includes performing, by the sixth calculation circuit, an exclusive OR calculation on the first result and the second result that are of each bit of the $(X+b)^{th}$ data segment, so as to obtain the scrambling result of each bit of the $(X+b)^{th}$ data segment.

The number of bits included in the third data is $(X+b) \times M$, high order $b \times M$ bits of the third data is equal to a first binary sequence, the first binary sequence includes b data segments, and a sequential order, in the first binary sequence, of the b data segments is the $(X+1)^{th}$ data segment to the $(X+b)^{th}$ data segment successively.

In S103 in the foregoing process, the number of bits of the input data sent to each scrambling circuit may be related to an Ethernet frame stream to which a data segment corresponding to the scrambling circuit belongs and to a location of the data segment in the Ethernet frame stream. The following describes an implementation of distributing input data to each scrambling circuit.

In an implementation, the X data segments are separately corresponding to X pieces of information, and the Y data segments are separately corresponding to Y pieces of information. The X pieces of information are used to indicate that the X data segments belong to the first Ethernet frame stream, and used to indicate a location, in the first Ethernet frame stream, of each data segment in the X data segments. The Y pieces of information are used to indicate that the Y data segments belong to the second Ethernet frame stream, and used to indicate a location, in the second Ethernet frame stream, of each data segment in the Y data segments.

A process of distributing the first data to the first calculation circuit may include: obtaining, according to indication of the X pieces of information, the first Ethernet frame stream from the received Ethernet frame streams in the first clock cycle, where the first Ethernet frame stream includes the X data segments. The process also includes distributing the first Ethernet frame stream to the first calculation circuit.

A process of distributing the third data to the fourth calculation circuit may include: obtaining, according to indication of the Y pieces of information, the second Ethernet frame stream from the received Ethernet frame streams in the first clock cycle, where the second Ethernet frame stream includes the Y data segments. The process also includes distributing the second Ethernet frame stream to the fourth calculation circuit.

Optionally, the first information to the $X^{th}$ information in the X pieces of information are corresponding to the first data segment to the $X^{th}$ data segment respectively, and the $X^{th}$ information is further used to indicate that the $X^{th}$ data segment is the last data segment in the first Ethernet frame stream. Correspondingly, the process may further include: saving a scrambling result of the first Ethernet frame stream in the first clock cycle according to the indication of the $X^{th}$ information.

It may be seen from the foregoing description that, in a scenario of a flexible Ethernet, the number of Ethernet frame streams received by an Ethernet interface of a receiver and a bit width of each Ethernet frame stream may need to be adjusted. In this embodiment of the present invention, X scramblers may separately calculate scrambling results of the X data segments, Y scrambles may separately calculate scrambling results of the Y data segments, and the number of bits included in any data segment in the X data segments is equal to the number (both are M) of bits included in any data segment in the Y data segments. Therefore, if an adjusted bit width of each Ethernet frame stream is an integral multiple of M, and the bit width of the Ethernet frame stream is less than or equal to $(X+Y) \times M$, then the X scramblers and the Y scramblers may be reconfigured to perform scrambling on each adjusted Ethernet frame stream.

To facilitate understanding of the foregoing embodiment, the following describes a specific implementation process of the foregoing embodiment by using an architecture of a bandwidth-flexible Ethernet as an example.

In the bandwidth-flexible Ethernet, a sub MAC stream having a rate U is used as a basic unit, and flexible grouping is performed in a case of fixed total interface bandwidth T to generate a plurality of sub MAC stream combinations having a rate of n (1≤n≤N, N=T/U) times the rate U. In a scrambling process, concurrent processing need to be performed on all of any number of sub MAC stream combinations having any bandwidth.

The following first uses the following scrambling polynomial as an example to describe a concurrent scrambling principle of this embodiment of the present invention:

$$s(x)=1+x^{39}+x^{58}.$$

Assuming that concurrent scrambling data has n bits, scrambling results from bit 0 to bit (n−1) may be obtained by means of formula derivation, and a derivation process is as follows:

$$S'_0 = b_0 \wedge S_{38} + S_{57}$$
$$S'_1 = b_1 \wedge S_{37} + S_{56}$$
$$\ldots$$
$$S'_{62} = b_{62} \wedge (b_{23} \wedge S_{15} \wedge S_{34}) \wedge (b_4 \wedge S_{34} \wedge S_{53})$$
$$S'_{63} = b_{63} \wedge (b_{24} \wedge S_{14} \wedge S_{33}) \wedge (b_5 \wedge S_{33} \wedge S_{52})$$
$$\ldots$$
$$S'_n = XOR(b_{s0}, b_{s1}, b_{s2}, \cdots b_{sn}) \wedge XOR(S_{s0}, S_{s1}, S_{s2} \cdots S_{s57})$$

where: $S_n'$ is a scrambling result of the $n^{th}$ bit, and is an exclusive OR result of $XOR(b_{s0}, b_{s1}, b_{s2}, \ldots b_{sn})$ and $XOR(S_{s0}, S_{s1}, S_{s2} \ldots S_{s57})$; $(b_{s0}, b_{s1}, b_{s2}, \ldots b_{sn})$ are input bits at the current moment, and may include 1 to (n+1) related bits, and $XOR(b_{s0}, b_{s1}, b_{s2}, \ldots b_{sn})$ indicates an exclusive OR result of the related input data at the current moment; and $(S_{s0}, S_{s1}, S_{s2} \ldots S_{s57})$ are bit values of a 58-bit shift register, that is, the last 58 bits of a scrambling result at a previous moment, and may include 1 to 58 related bits; and $XOR(S_{s0}, S_{s1}, S_{s2} \ldots S_{s57})$ indicates an exclusive OR result of the current related bit values of the 58-bit shift register.

For ease of description, the following represents the foregoing $XOR(b_{s0}, b_{s1}, b_{s2}, \ldots b_{sn})$ as Calc_dat, and represents the foregoing $XOR(S_{s0}, S_{s1}, S_{s2} \ldots S_{s57})$ as Calc_srg. That is, Calc_dat is an exclusive OR calculation formula of all input bits related to the scrambling result $S_n'$, and Calc_srg is an exclusive OR calculation formula of all shift register values related to the scrambling result $S_n'$.

It may be learned from the foregoing derivation formulas that, a concurrent scrambling result of each bit is obtained by performing an exclusive OR operation separately on calculated Calc_dat and Calc_srg results.

Figure 2:
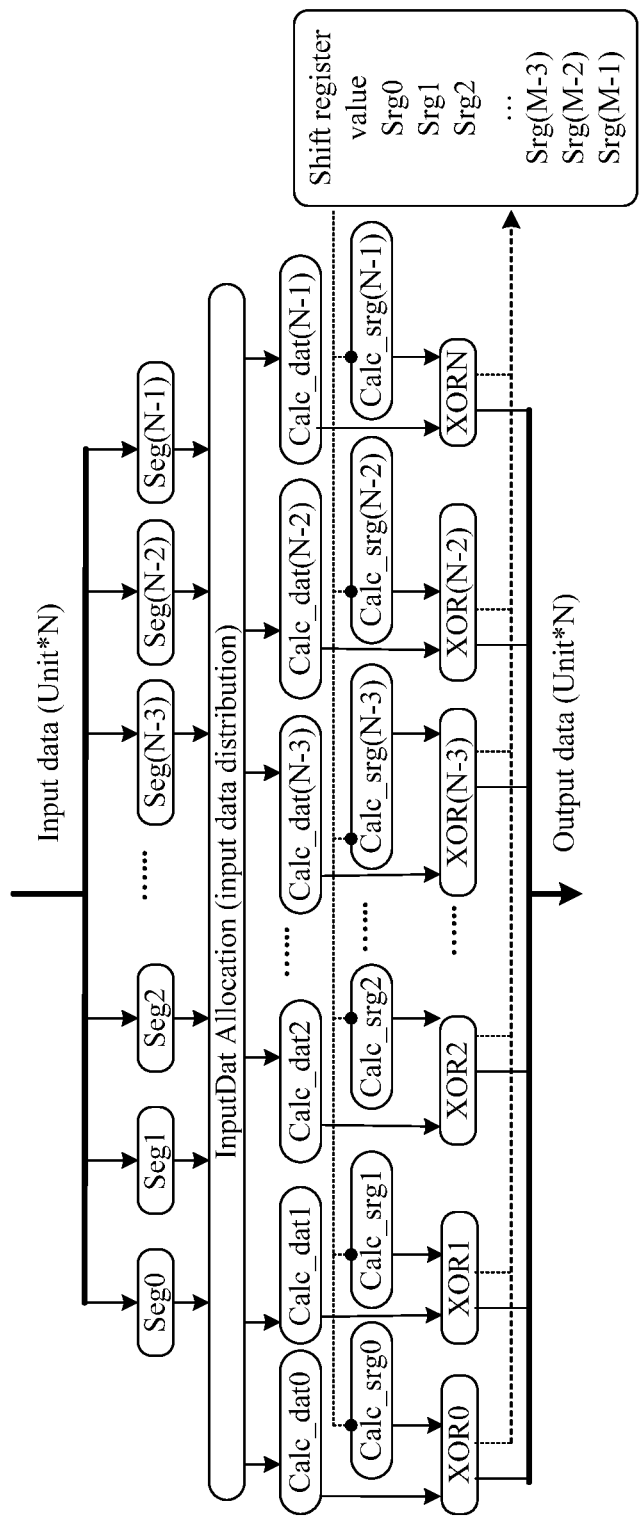
FIG. 2 is a schematic diagram of a scrambling architecture according to an embodiment of the present invention.
Figure 3:
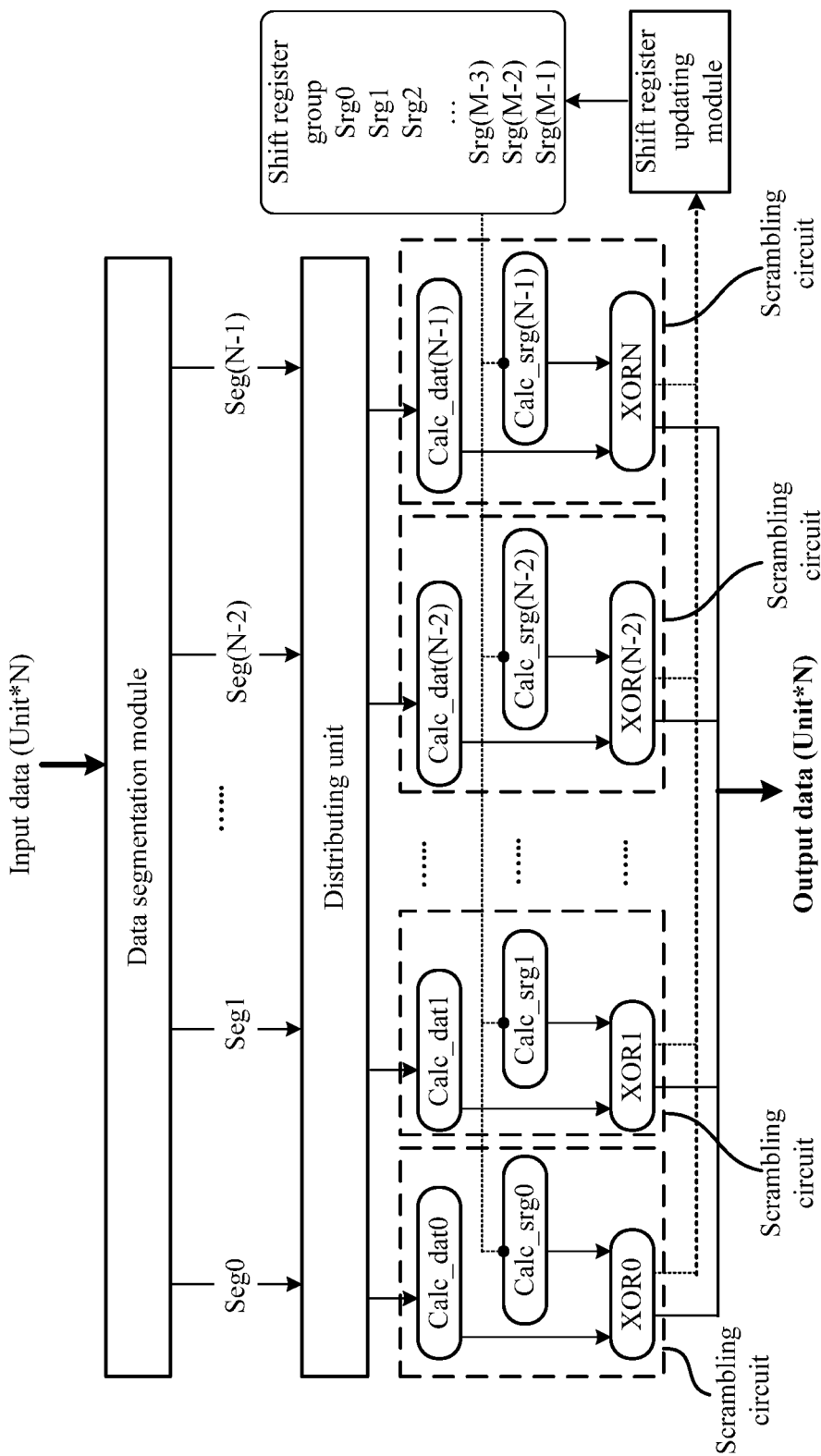
FIG. 3 is a schematic structural diagram of a scrambling circuit according to an embodiment of the present invention.

FIG. 2 shows a scrambling architecture provided in an embodiment of the present invention. FIG. 3 shows a structure of a scrambling circuit based on the architecture.

Referring to FIG. 2 and FIG. 3, a total bandwidth of data received by a receiver within one clock cycle is Unit×N bits, where Unit is the number of bits of each data segment, N is the number of data segments (N data segments are represented as Seg0, Seg1, . . . , Seg(N−1) in the figure), there may be a plurality of sub MAC streams received within one clock cycle, and the number of data segments included in each sub MAC stream may be the same, or may be different. A data segmentation module divides a sub MAC stream that is input within one clock cycle into N data segments.

The scrambling circuits are in a one-to-one correspondence with the data segments. Each scrambling circuit may include a Calc_dat circuit (which is corresponding to the foregoing first calculation circuit or fourth calculation circuit, and represented as Calc_dat0, Calc_dat1, . . . , and Calc_dat(N−1) in the figure), a Calc_srg circuit (which is corresponding to the foregoing second or fifth calculation circuit, and represented as Calc_srg0, Calc_srg1, . . . , and Calc_srg(N−1) in the figure), and an XOR circuit (which is corresponding to the foregoing third calculation circuit or sixth calculation circuit, and represented as XOR0, XOR1, . . . , and XOR (N−1) in the figure).

A Calc_dat circuit corresponding to each data segment performs an operation according to the derivation formulas of the foregoing concurrent scrambling principle and data output by a distribution unit to the Calc_dat circuit, and outputs an operation result; a Calc_srg circuit corresponding to each data segment performs an operation according to the derivation formulas of the foregoing concurrent scrambling principle and data output by the distribution unit to the Calc_srg circuit, and outputs an operation result. An XOR circuit corresponding to each data segment performs an exclusive OR operation on the output results of the Calc_dat circuit and the Calc_srg circuit corresponding to the data segment, and outputs an operation result. In this case, data output by XOR circuits corresponding to all data segments form concurrent data that is scrambled.

A shift register group includes M shift registers (where M≤N, and N is the number of data segments). The number of shift registers is determined by the actual number of sub MAC streams, that is, the number of shift registers is the same as the number of sub MAC streams obtained by division. According to a sub MAC stream distribution status of a MAC distributing module, one 58-bit shift register is allocated to each sub MAC stream.

The foregoing Calc_dat circuit, Calc_srg circuit, and XOR circuit may be implemented by using logic circuits, for example, an exclusive OR logic circuit; the data segmentation module and the distribution unit may be implemented by using logic circuits; and a shift register updating module may also be implemented by using a logic circuit.

Referring to FIG. 3, the following describes a scrambling process of a bandwidth-flexible Ethernet provided in an embodiment of the present invention. The process may include:

In S101-S102, the data segmentation module performs, according to a granularity of Unit bits, segmentation on a sub MAC stream that is input within one clock cycle, and sets pieces of information for all data segments.

The data segmentation module may perform, according to the granularity of the Unit bits, segmentation on bandwidth-fixed data that is output after being coded by a coding module at a PCS sublayer, and set the pieces of information for all data segments with reference to a sub MAC stream distribution result of a sub MAC stream distributing module at the PCS sublayer.

The number of data segments included in a sub MAC stream is determined by grouping configuration information. The grouping configuration information may be initially configured in the data segmentation module, or may be generated and updated to the data segmentation module by software.

The pieces of information is used to identify a characteristic of a data segment, for example, a sub MAC stream to which the data segment belongs, a data segment, in the sub MAC stream, to which the data segment belongs, and whether the data segment is the last data segment in the sub MAC stream. Specifically, the pieces of information may include the following content.

A Stream no identifier that is used to identify a sub MAC stream to which a data segment belongs.

A Scramble no identifier that is used to identify a data segment, in a sub MAC stream, to which a data segment belongs, that is, to which data segment of the sub MAC stream the data segment belongs.

A Flag identifier that is used to identify whether a data segment is the last data segment in a sub MAC stream.

For example, assuming that a maximum number of sub MAC streams is 16 and a maximum number of data segments is 16, the pieces of information may be set as nine bits. As shown in Table 1, bit 0, as the Flag identifier, is used to identify whether a data segment is the last data segment in a sub MAC stream to which the data segment belongs. Bits 1 to 4, as the Stream no identifier, are used to identify a sub MAC stream, in sub MAC streams 0 to 15, to which the data segment belongs. Bits 5 to 8, as the Scramble no identifier, are used to identify a data segment, in data segments 1 to 15 in the sub MAC stream, to which the data segment belongs. According to segment identification information, it may be learned that how many sub MAC streams are received within one clock cycle, and a start border and an end border of each sub MAC stream.

TABLE 1

Segment identification information of parallel data on a bandwidth-flexible Ethernet

| Flag (bit 0) | Stream no (bit 1-bit 4) | Scramble no (bit 5-bit 8) |
|---|---|---|
| 1 | 0010 | 0010 |
| ... | ... | ... |

In Table 1, Stream no=0010 indicates that the data segment belongs to a sub MAC stream 2 (sub MAC streams are numbered starting from 0); Scramble no=0010 indicates that the data segment belongs to the third data segment (data segments are numbered starting from 0) of the sub MAC stream 2; and Flag=1 indicates that the data segment is the last data segment in the sub MAC stream 2.

In S103, the distribution unit distributes input data to a corresponding scrambling circuit of each data segment according to pieces of information of each data segment. According to the foregoing principle, for each data segment, the distribution unit may perform the following operations.

Step a: Select all input data, from a start location (low order bit) to a current segment location, from the sub MAC stream received within one clock cycle to serve as a selected source for allocation.

Step b: Select, according to the scramble no identifier in the pieces of information and from source data selected in step a, effective data in a high order bit to low order bit order, where a width of the selected effective data is a start bit of a first data segment to an end bit of a current segment, and the first data segment and the current segment are in the sub MAC stream to which the current data segment belongs.

Step c: By using the effective data selected in step b as low order-bit location data and filling high order-bit location data with 0, generate data whose bandwidth is the same as bandwidth of the source data selected in step a, and output the generated data to a Calc_dat circuit of a scrambling circuit corresponding to the current data segment.

For example, the current data segment is the sixth segment of the concurrent data (starting from low order-bit data, and the data segments are numbered starting from 1), and is a data segment 2 of the sub MAC stream 2 (the data segments in the sub MAC stream are numbered starting from 0), then a scrambling circuit corresponding to the data segment is a scrambling circuit 6, and a Calc_dat circuit in the scrambling circuit 6 is a Calc_dat6. In this scenario, in step a, the distribution unit selects six data segments (a width is Unit*6) from a start location bit 0, to serve as the source data. The current data segment is the data segment 2 of the sub MAC stream 2, which indicates that a scrambling result of the data segment is related only to a data segment 0, a data segment 1, and the data segment 2 of the sub MAC stream 2, that is, related to the fourth, fifth, and sixth data segments. Therefore, in step b, in the source data selected in step a, the distribution unit selects, in the high order bit to low order bit order, data having a width of Unit*3 as the effective data; and in step c, the distribution unit outputs data having a width of Unit*6 to the Calc_dat6, where the bit 0 to the (Unit*3−1)$^{th}$ bit of the output data are the effective data selected in step b (the effective data serves as low order-bit data segments of an output result according to same high order-to-low order bit locations), and other high order bit locations are filled with 0.

Figure 4:
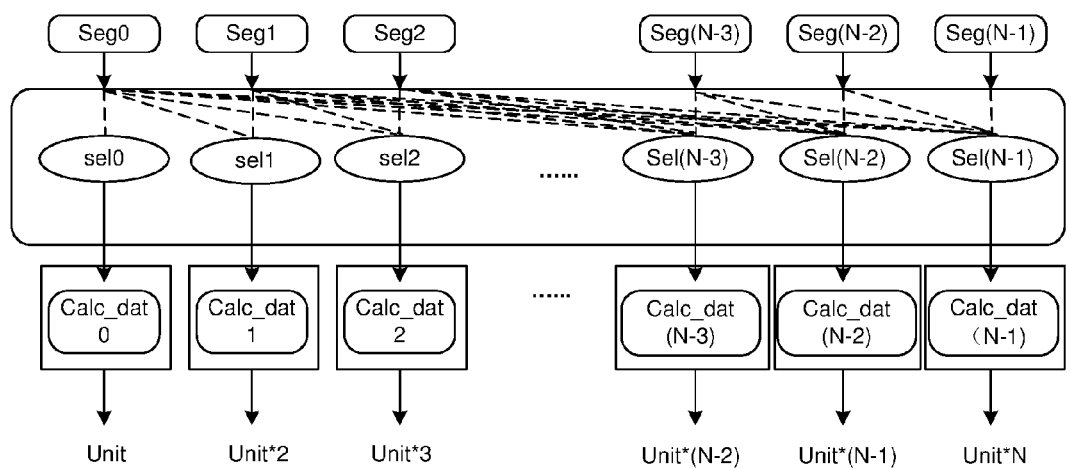
FIG. 4 is a schematic diagram of distributing input data by a distribution unit to each Calc_dat circuit according to an embodiment of the present invention.

FIG. 4 shows a schematic diagram of source data selected by a distribution unit for each Calc_dat circuit. It may be seen that, the distribution unit selects, for a Calc_dat0 corresponding to a data segment 0 (the first data segment), the data segment 0 as source data (a width is Unit*1). The distribution unit also selects, for a Calc_dat1 corresponding to a data segment 1, the data segment 0 and the data segment 1 as source data (a width is Unit*2). The distribution unit further selects, for a Calc_dat2 corresponding to the a data segment 2, the data segment 0, the data segment 1, and the data segment 2 as source data (a width is Unit*3); and by analogy, selects, for a Calc_datN corresponding to a data segment N, the data segment 0 to the data segment N as source data (a width is Unit*N).

For each data segment, the distribution unit determines, according to the Scramble no identifier in the pieces of information of the current data segment, a sub MAC stream to which the current data segment belongs, and distributes values of a 58-bit shift register corresponding to the sub MAC stream, serving as input data of a Calc_srg circuit corresponding to the current data segment, to the Calc_srg circuit corresponding to the current data segment. The distribution unit may also send the Scramble no identifier in the pieces of information of the current data segment to the corresponding Calc_srg circuit, so as to enable the Calc_srg circuit to obtain a value of a corresponding shift register from a shift register group according to the Scramble no identifier.

Figure 5:
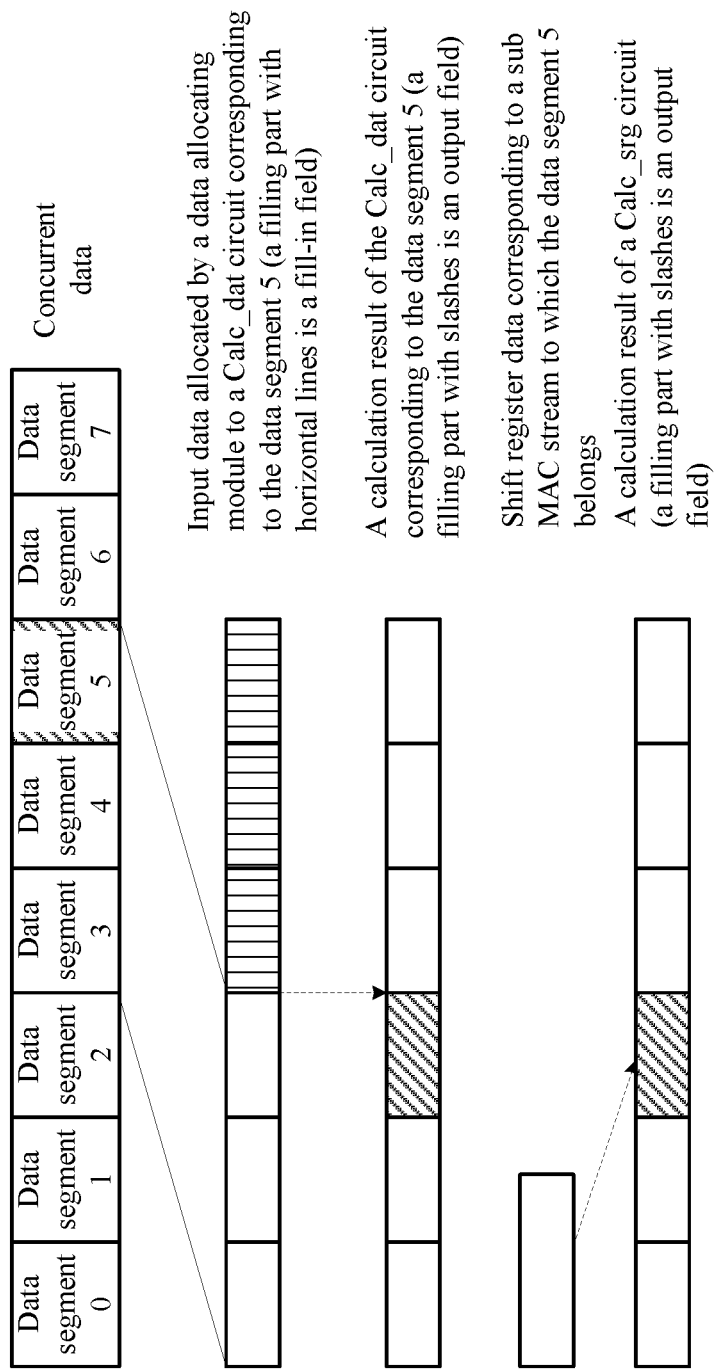
FIG. 5 is a schematic diagram of distributing data by a distribution unit according to an embodiment of the present invention.

FIG. 5 is a schematic diagram of distributing input data to a scrambling circuit by a distribution unit. As shown in the figure, concurrent data is divided by the data segmentation module into eight data segments (from a data segment 0 to a data segment 7), and the sub MAC stream 2 includes three data segments (from a data segment 3 to a data segment 5). Data distributed by the distribution unit to a Calc_dat circuit corresponding to the data segment 5 is shown in the figure, where a filling part with slashes is a calculation result that needs to be output.

In S104, each scrambling circuit performs scrambling processing according to the distributed input data, and outputs a scrambling result. In this process, a Calc_dat circuit in each scrambling circuit performs an operation according to the input data distributed by the distribution unit to obtain an operation result of each bit of the input data, and selects an operation result, of a corresponding data segment, from the operation results according to a scramble no identifier of the data segment, to serve as an output result of the Calc_dat circuit. The Calc_srg circuit performs a calculation according to 58 bits output by the distribution unit, and selects data having a corresponding width from the operation results according to a Scramble no identifier of the data segment, to serve as an output result of the Calc_srg circuit. Widths of the output data of the two circuits are both the same as a segment width, and both the output data is output to an XOR circuit.

Each Calc_dat circuit may perform processing according to the following manners.

After obtaining the input data of the Calc_dat circuit from the distribution unit, calculating operation results of all bits in a range of the input data according to the foregoing concurrent scrambling principle. For example, For $b_0$, an operation result of the Calc_dat circuit for the bit is $b_0$;

for $b_1$, an operation result of the Calc_dat circuit for the bit is $b_1$;

and so on, until for $b_{62}$, an operation result of the Calc_dat circuit for the bit is $b_{62}\hat{\ }b_{23}\hat{\ }b_4$;

for $b_{63}$, an operation result of the Calc_dat circuit for the bit is $b_{63}\hat{\ }b_{24}\hat{\ }b_5$;

and so on.

A width of the foregoing calculation result is the same as a width of the input data. However, considering that a calculation result of a data segment corresponding to the circuit is meaningful, only the calculation result of the data segment corresponding to the Calc_dat circuit is output. During specific implementation, the distribution unit may send a scramble no identifier of each Calc_dat circuit to the Calc_dat circuit. In this case, when outputting an operation result, the Calc_dat circuit may output only an operation result of the data segment according to the identifier of the data segment.

Each Calc_srg circuit may perform processing according to the following manners.

After obtaining the Scramble no identifier from the distribution unit, obtaining, from a shift register group, a 58-bit register value of a shift register corresponding to the Scramble no identifier, and performing an operation according to the foregoing concurrent scrambling principle (if the Calc_srg circuit directly obtains the value of the shift register from the distribution unit, the foregoing step is omitted). For example, for $b_0$, a result output by the Calc_srg circuit is the 39th bit value of the shift register;

for $b_1$, a result output by the Calc_srg circuit is the 38th bit value of the shift register;

and so on, until for $b_{62}$, a result output by the Calc_srg circuit is an exclusive OR result of the following bit values of the shift register: $S_{15}\hat{\ }S_{34}\hat{\ }S_{34}\hat{\ }S_{53}$.

for $b_{63}$, a result output by the Calc_srg circuit is an exclusive OR result of the following bit values of the shift register: $S_{14}\hat{\ }S_{33}\hat{\ }S_{33}\hat{\ }S_{52}$;

and so on.

Figure 6:
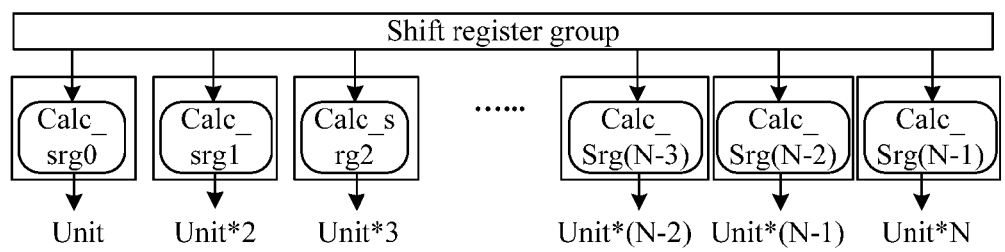
FIG. 6 is a schematic diagram of distributing input data by a distribution unit to each Calc_srg circuit according to an embodiment of the present invention.

A data width of the operation result of the Calc_srg circuit is the same as a data width of the operation result of the Calc_dat circuit. FIG. 6 shows a schematic diagram of distributing input data to each Calc_srg circuit by a distribution unit and a data width of an operation result of each Calc_srg circuit. It may be seen that, a data width of an operation result of a Calc_srg 0 is Unit*1; a data width of an operation result of a Calc_srg 1 is Unit*2; a data width of an operation result of a Calc_srg 2 is Unit*3; and by analogy, a data width of an operation result of a Calc_srg (N−1) is Unit*N. Similar to the Calc_dat circuit, although the data width of the foregoing operation result is the same as a width of the input data of the Calc_dat circuit, considering that only an operation result of a data segment corresponding to the circuit is meaningful, when outputting an operation result, the Calc_srg circuit may output only the operation result of the data segment according to the Scramble no identifier of the data segment, that is, a width of an output result of the Calc_srg circuit is a width of one data segment.

Processing processes of each Calc_dat circuit and each Calc_srg circuit may be performed concurrently.

Each XOR circuit performs an exclusive OR operation on operation results output by a corresponding Calc_dat circuit and Calc_srg circuit, and outputs an operation result. The operation result output by each XOR circuit is data of a scrambled data segment corresponding to the XOR circuit. Operation results output by all operation processing circuits form a result of the sub MAC streams that are received within one clock cycle and scrambled.

Further, in addition to outputting a scrambling result, a scrambling circuit further needs to update a value of a 58-bit shift register. It may be learned from the foregoing concurrent scrambling principle that the value of the 58-bit shift register comes from the last 58 bits of a scrambling result of a previous clock cycle. According to the principle and for each data segment, according to a Flag identifier and a Stream no identifier in pieces of information of a current data segment, a shift register updating module determines a sub MAC stream to which the current data segment belongs. The shift register updating module also determines whether the current segment is the last data segment in the sub MAC stream; and if yes, uses a value of last 58 bits of a scrambling result of the sub MAC stream to which the current data segment belongs to update a value of a shift register corresponding to the sub MAC stream to which the current data segment belongs.

Figure 7:
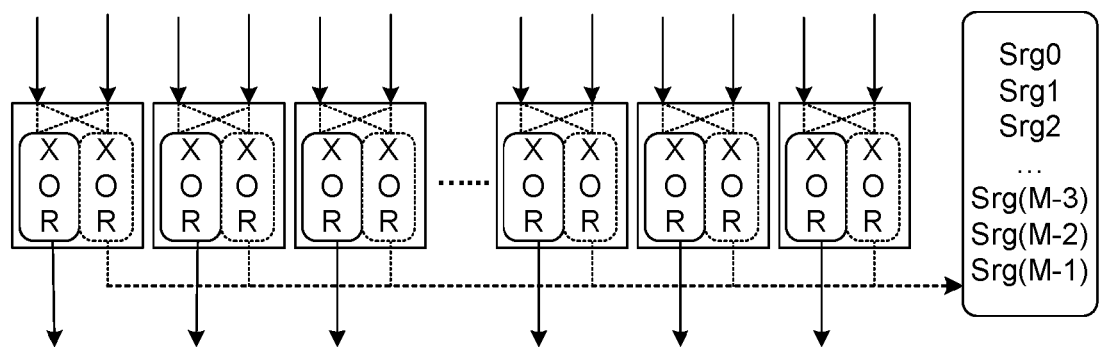
FIG. 7 is a schematic diagram of updating a shift register according to an embodiment of the present invention.

FIG. 7 shows a schematic diagram of updating a value of a shift register. As shown in the figure, each sub MAC stream includes two data segments, and for each sub MAC stream, the last 58 bits output by an XOR circuit corresponding to the second data segment in the sub MAC stream are used to update a value of a shift register corresponding to the sub MAC stream.

Concurrent processing of calculation processes of a Calc_srg circuit and a Calc_dat circuit enables a concurrent scrambling calculation process in this embodiment of the present invention to reach a high running speed, meeting a timing requirement of a logic design.

It may be seen from the foregoing description that, according to the scrambling solution provided in this embodiment of the present invention, concurrent data is segmented, and flexible grouping and separate scrambling processing of data segments are implemented by using segment identification information. This solution effectively meets processing requirements on a plurality of concurrent scramblers having different widths due to diversity in bandwidth of and the number of interfaces in a bandwidth-flexible Ethernet.

In conclusion, by using this embodiment of the present invention, a calculation problem involving a large amount of data for a plurality of concurrent scramblers that are flexibly grouped can be resolved. In a conventional manner, a plurality of concurrent solutions needs to be designed for scramblers having different specifications. In addition, flexibility of grouping causes a great number of logical resources to be occupied. However, by using this embodiment of the present invention, occupied resources may be effectively reduced, and a timing requirement can be met.

Figure 8:
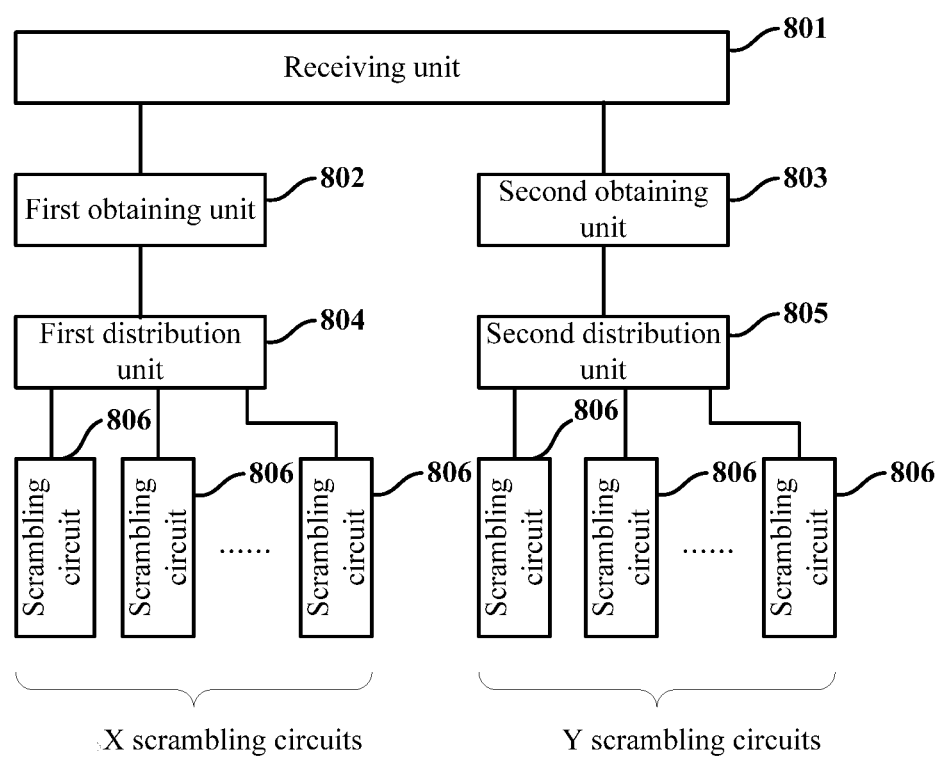
FIG. 8 is a schematic structural diagram of a scrambling apparatus according to an embodiment of the present invention.

An embodiment of the present invention further provides a scrambling apparatus. FIG. 8 is a schematic structural diagram of a scrambling apparatus according to an embodiment of the present invention. The scrambling apparatus may be configured to execute the method shown in FIG. 1. The scrambling apparatus may be a receiver of a network apparatus. The receiver may include an Ethernet interface. The receiver may be implemented by using an ASIC or an FPGA. The network apparatus may be a router, a network switch, a firewall, a load balancer, a data center, a PTN apparatus, or a WDM apparatus. As shown in the figure, the scrambling apparatus may include the following.

A receiving unit 801 configured to receive Ethernet frame streams in a first clock cycle.

A first obtaining unit 802 configured to obtain X data segments from the Ethernet frame streams in the first clock cycle that are received by the receiving unit 801, where the X data segments are data segments of a first Ethernet frame stream in the first clock cycle, the number of bits of each data segment in the X data segments is M, M is an integer greater than 1, and X is a positive integer.

A second obtaining unit 803 configured to obtain Y data segments from the Ethernet frame streams in the first clock cycle that are received by the receiving unit 801, where the Y data segments are data segments of a second Ethernet frame stream in the first clock cycle, the number of bits of each data segment in the Y data segments is M, and Y is a positive integer.

A first distribution unit 804 configured to separately distribute X pieces of input data to X scrambling circuits 806, where the X scrambling circuits 806 are in a one-to-one correspondence with the X pieces of input data.

A second distribution unit 805 configured to separately distribute Y pieces of input data to Y scrambling circuits 806, where the Y scrambling circuits 806 are in a one-to-one correspondence with the Y pieces of input data.

The X scrambling circuits 806 configured to calculate concurrently scrambling results of the X data segments according to a scrambling polynomial and by separately using the X pieces of input data distributed by the first distribution unit 804, where the X data segments are in a one-to-one correspondence with the X scrambling circuits 806, and each scrambling circuit of the X scrambling circuits 806 is configured to calculate concurrently a scrambling result of a binary sequence in which the number of bits is M.

The Y scrambling circuits 806 configured to calculate concurrently scrambling results of the Y data segments according to the scrambling polynomial and by separately using the Y pieces of input data distributed by the second distribution unit 805, where the Y data segments are in a one-to-one correspondence with the Y scrambling circuits 806, and each scrambling circuit of the Y scrambling circuits 806 is configured to calculate concurrently a scrambling result of a binary sequence in which the number of bits is M.

The X data segments include the first data segment to the $X^{th}$ data segment, and a sequential order of locations of the X data segments borne in the first Ethernet frame stream in the first clock cycle is the first data segment to the $X^{th}$ data segment successively.

The first distribution unit 804 is specifically configured to distribute the $a^{th}$ input data to the $a^{th}$ scrambling circuit 806, where values of a are integers from 1 to X.

Figure 9A:
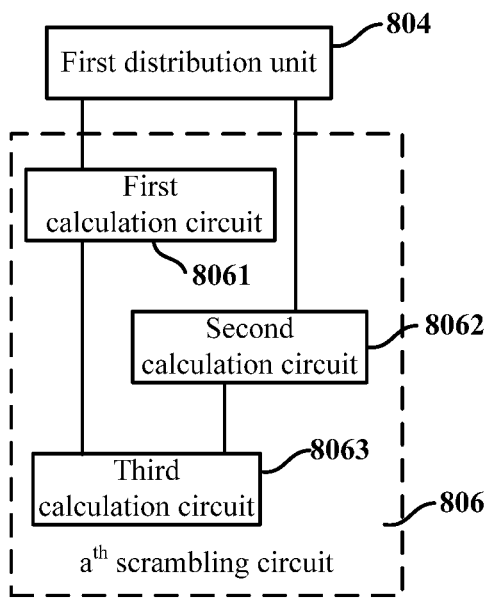
FIG. 9A and FIG. 9B are schematic structural diagrams of a scrambling circuit in FIG. 8.

The first distribution unit 804 is configured to perform the following. Distribute first data and second data to a first calculation circuit 8061 and a second calculation circuit 8062 respectively, where the $a^{th}$ input data includes the first data and the second data, where the $a^{th}$ scrambling circuit 806 includes the first calculation circuit 8061, the second calculation circuit 8062, and a third calculation circuit 8063 (refer to FIG. 9A). The first data includes the first data segment to the $a^{th}$ data segment, and the second data includes the last N bits in a scrambling result of a first Ethernet frame stream in a second clock cycle, where N is a degree of the scrambling polynomial, and the second clock cycle is a clock cycle immediately before the first clock cycle.

The X scrambling circuits 806 include the $a^{th}$ scrambling circuit, and the $a^{th}$ scrambling circuit 806 is configured to calculate concurrently a scrambling result of the $a^{th}$ data segment according to the scrambling polynomial and by using the $a^{th}$ input data.

The $a^{th}$ scrambling circuit 806 is configured to calculate concurrently a scrambling result of the $a^{th}$ data segment according to the scrambling polynomial and by using the $a^{th}$ input data, wherein the following are provided.

The first calculation circuit 8061 is configured to perform an exclusive OR calculation on all related bits of each bit of the $a^{th}$ data segment in the first data, so as to obtain a first result of each bit of the $a^{th}$ data segment.

The second calculation circuit 8062 is configured to perform an exclusive OR calculation on all related bits of each bit of the $a^{th}$ data segment in the second data, so as to obtain a second result of each bit of the $a^{th}$ data segment.

The third calculation circuit 8063 is configured to perform an exclusive OR calculation on the first result and the second result that are of each bit of the $a^{th}$ data segment, so as to obtain the scrambling result of each bit of the $a^{th}$ data segment.

The Y data segments include the $(X+1)^{th}$ data segment to the $(X+Y)^{th}$ data segment, and a sequential order of locations of the Y data segments borne in the first Ethernet frame stream in the first clock cycle is the $(X+1)^{th}$ data segment to the $(X+Y)^{th}$ data segment successively.

The second distribution unit 805 is configured to distribute the $(X+b)^{th}$ input data to the $(X+b)^{th}$ scrambling circuit 806, where a value of b is an integer from 1 to Y.

Figure 9B:
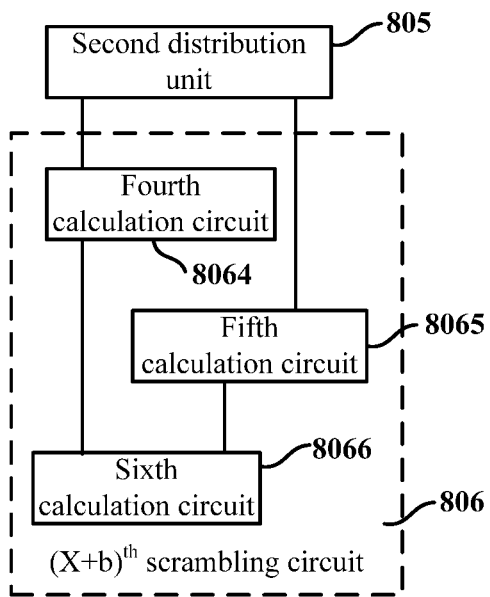

The second distribution unit 805 is specifically configured to perform the following. Distribute third data and fourth data to a fourth calculation circuit 8064 and a fifth calculation circuit 8065 respectively, where the $(X+b)^{th}$ input data includes the third data and the fourth data, the $(X+b)^{th}$ scrambling circuit 806 includes the fourth calculation circuit 8064, the fifth calculation circuit 8065, and a sixth calculation circuit 8066 (refer to FIG. 9B), the third data includes the $(X+1)^{th}$ data segment to the $(X+b)^{th}$ data segment, and the fourth data includes the last N bits of a scrambling result of a second Ethernet frame stream in the second clock cycle.

The Y scrambling circuits 806 includes the $(X+b)^{th}$ scrambling circuit, and the $(X+b)^{th}$ scrambling circuit 806 is configured to calculate concurrently a scrambling result of the $(X+b)^{th}$ data segment according to the scrambling polynomial and by using the $(X+b)^{th}$ input data.

The fourth calculation circuit 8064 is configured to perform an exclusive OR calculation on all related bits of each bit of the $(X+b)^{th}$ data segment in the third data, so as to obtain a first result of each bit of the $(X+b)^{th}$ data segment.

The fifth calculation circuit 8065 is configured to perform an exclusive OR calculation on all related bits of each bit of the $(X+b)^{th}$ data segment in the fourth data, so as to obtain a second result of each bit of the $(X+b)^{th}$ data segment.

The sixth calculation circuit 8066 is configured to perform an exclusive OR calculation on the first result and the second result that are of each bit of the $(X+b)^{th}$ data segment, so as to obtain the scrambling result of each bit of the $(X+b)^{th}$ data segment.

The number of bits included in the third data is $(X+b) \times M$, high order $b \times M$ bits of the third data is equal to a first binary sequence, the first binary sequence includes b data segments, and a sequential order, in the first binary sequence, of the b data segments is the $(X+1)^{th}$ data segment to the $(X+b)^{th}$ data segment successively.

Preferably, the Y data segments are separately corresponding to Y pieces of information, and the Y pieces of information are used to indicate that the Y data segments belong to the second Ethernet frame stream, and are used to indicate a location, in the second Ethernet frame stream, of each data segment in the Y data segments. The second distribution unit 805 is specifically configured to: obtain, according to the Y pieces of information, the second Ethernet frame stream from the received Ethernet frame streams in the first clock cycle, where the second Ethernet frame stream includes the Y data segments; and distribute the second Ethernet frame stream to the fourth calculation circuit.

Preferably, the X data segments are separately corresponding to X pieces of information, and the X pieces of information are used to indicate that the X data segments belong to the first Ethernet frame stream, and are used to indicate a location, in the first Ethernet frame stream, of each data segment in the X data segments. The first distribution unit 804 is specifically configured to: obtain, according to the X pieces of information, the first Ethernet frame stream from the received Ethernet frame streams in the first clock cycle, where the first Ethernet frame stream includes the X data segments; and distribute the first Ethernet frame stream to the first calculation circuit.

Optionally, the first information to the $X^{th}$ information in the X pieces of information are corresponding to the first data segment to the $X^{th}$ data segment respectively, and the $X^{th}$ information is further used to indicate that the $X^{th}$ data segment is the last data segment in the first Ethernet frame stream. The scrambling apparatus may further include: a storage unit (not shown in the figure), configured to save a scrambling result of the first Ethernet frame stream in the first clock cycle according to the $X^{th}$ information.

An embodiment of the present invention further provides a scrambling apparatus. The scrambling apparatus may be configured to execute the method shown in FIG. 1. The apparatus may be one of the following apparatuses.

A PHY, where the PHY may be implemented by using an FPGA or an ASIC; the PHY may be a part in a network interface card (NIC), where the NIC may be a line card or a PIC (Physical Interface Card); and the PHY may include a Media-Independent Interface (MII) for interfacing to a MAC.

A PHY chip, where the PHY chip may include a plurality of PHYs; and the PHY chip may be implemented by using an FPGA or an ASIC.

A system chip, where the system chip may include a plurality of MACs and a plurality of PHYs; and the system chip may be implemented by using an FPGA or an ASIC; and a multi-port Ethernet device, where the multi-port Ethernet device may be an Ethernet hub, an Ethernet router, or an Ethernet switch. The multi-port Ethernet device includes a plurality of ports, where each port may include a system chip, and the system chip may include a MAC and a PHY. The multi-port Ethernet device may further integrate a plurality of MACs into one MAC chip, and integrate a plurality of PHYs into one PHY chip. The multi-port Ethernet device may also integrate a plurality of MACs and a plurality of PHYs into one system chip.

The apparatus can execute the scrambling method provided in the foregoing embodiments of the present invention.

The present disclosure is described with reference to the flowcharts and/or block diagrams of the method, the device (or system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, comprising:
    receiving Ethernet frame streams in a first clock cycle;
    obtaining X data segments, wherein the X data segments are data segments of a first Ethernet frame stream in the first clock cycle, wherein the number of bits of each data segment in the X data segments is M, wherein M is an integer greater than 1, and wherein X is a positive integer;

obtaining Y data segments, wherein the Y data segments are data segments of a second Ethernet frame stream in the first clock cycle, wherein the number of bits of each data segment in the Y data segments is M, and wherein Y is a positive integer;

separately distributing X pieces of input data to X scrambling circuits, wherein the X scrambling circuits are in a one-to-one correspondence with the X pieces of input data;

separately distributing Y pieces of input data to Y scrambling circuits, wherein the Y scrambling circuits are in a one-to-one correspondence with the Y pieces of input data;

calculating concurrently, by the X scrambling circuits, scrambling results of the X data segments according to a scrambling polynomial and by separately using the X pieces of input data, wherein the X data segments are in a one-to-one correspondence with the X scrambling circuits, and wherein each scrambling circuit of the X scrambling circuits is configured to calculate concurrently a scrambling result of a binary sequence in which the number of bits is M; and calculating concurrently, by the Y scrambling circuits, scrambling results of the Y data segments according to the scrambling polynomial and by separately using the Y pieces of input data, wherein the Y data segments are in a one-to-one correspondence with the Y scrambling circuits, and wherein each scrambling circuit of the Y scrambling circuits is configured to calculate concurrently a scrambling result of a binary sequence in which the number of bits is M; wherein the X data segments comprise the first data segment to the $X^{th}$ data segment, a sequential order of locations of the X data segments borne in the first Ethernet frame stream in the first clock cycle is the first data segment to the $X^{th}$ data segment successively;

wherein the separately distributing X pieces of input data to X scrambling circuits comprises distributing the $a^{th}$ input data to the $a^{th}$ scrambling circuit, wherein values of a are integers from 1 to X, wherein the distributing the $a^{th}$ input data to the $a^{th}$ scrambling circuit comprises:

distributing first data and second data to a first calculation circuit and a second calculation circuit respectively, wherein the $a^{th}$ input data comprises the first data and the second data, wherein the $a^{th}$ scrambling circuit comprises the first calculation circuit, the second calculation circuit, and a third calculation circuit, wherein the first data comprises the first data segment to the $a^{th}$ data segment, wherein the second data comprises the last N bits in a scrambling result of a first Ethernet frame stream in a second clock cycle, wherein N is a degree of the scrambling polynomial, and wherein the second clock cycle is a clock cycle immediately before the first clock cycle.

2. The method according to claim 1, wherein the calculating concurrently, by the X scrambling circuits, scrambling results of the X data segments according to a scrambling polynomial and by separately using the X pieces of input data comprises calculating concurrently, by the $a^{th}$ scrambling circuit, a scrambling result of the $a^{th}$ data segment according to the scrambling polynomial and by using the $a^{th}$ input data, and wherein the calculating concurrently, by the $a^{th}$ scrambling circuit, a scrambling result of the $a^{th}$ data segment according to the scrambling polynomial and by using the $a^{th}$ input data comprises:

performing, by the first calculation circuit, an exclusive OR calculation on all related bits of each bit of the $a^{th}$ data segment in the first data, so as to obtain a first result of each bit of the $a^{th}$ data segment;

performing, by the second calculation circuit, an exclusive OR calculation on all related bits of each bit of the $a^{th}$ data segment in the second data, so as to obtain a second result of each bit of the $a^{th}$ data segment; and performing, by the third calculation circuit, an exclusive OR calculation on the first result and the second result that are of each bit of the $a^{th}$ data segment, so as to obtain the scrambling result of each bit of the $a^{th}$ data segment.

3. The method according to claim 1, wherein the Y data segments comprise the $(X+1)^{th}$ data segment to the $(X+Y)^{th}$ data segment, and a sequential order of locations of the Y data segments borne in the second Ethernet frame stream in the first clock cycle is the $(X+1)^{th}$ data segment to the $(X+Y)^{th}$ data segment successively.

4. The method according to claim 3, wherein the separately distributing Y pieces of input data to Y scrambling circuits comprises distributing the $(X+b)^{th}$ input data to the $(X+b)^{th}$ scrambling circuit, wherein a value of b is an integer from 1 to Y, wherein the distributing the $(X+b)^{th}$ input data to the $(X+b)^{th}$ scrambling circuit comprises:

distributing third data and fourth data to a fourth calculation circuit and a fifth calculation circuit respectively, wherein the $(X+b)^{th}$ input data comprises the third data and the fourth data, wherein the $(X+b)^{th}$ scrambling circuit comprises the fourth calculation circuit, the fifth calculation circuit, and a sixth calculation circuit, wherein the third data comprises the $(X+1)^{th}$ data segment to the $(X+b)^{th}$ data segment, and wherein the fourth data comprises the last N bits of a scrambling result of a second Ethernet frame stream in the second clock cycle.

5. The method according to claim 4, wherein the calculating concurrently, by the Y scrambling circuits, scrambling results of the Y data segments according to the scrambling polynomial and by separately using the Y pieces of input data comprises calculating concurrently, by the $(X+b)^{th}$ scrambling circuit, a scrambling result of the $(X+b)^{th}$ data segment according to the scrambling polynomial and by using the $(X+b)^{th}$ input data.

6. The method according to claim 5, wherein the calculating concurrently, by the $(X+b)^{th}$ scrambling circuit, a scrambling result of the $(X+b)^{th}$ data segment according to the scrambling polynomial and by using the $(X+b)^{th}$ input data comprises:

performing, by the fourth calculation circuit, an exclusive OR calculation on all related bits of each bit of the $(X+b)^{th}$ data segment in the third data, so as to obtain a first result of each bit of the $(X+b)^{th}$ data segment;

performing, by the fifth calculation circuit, an exclusive OR calculation on all related bits of each bit of the $(X+b)^{th}$ data segment in the fourth data, so as to obtain a second result of each bit of the $(X+b)^{th}$ data segment; and performing, by the sixth calculation circuit, an exclusive OR calculation on the first result and the second result that are of each bit of the $(X+b)^{th}$ data segment, so as to obtain the scrambling result of each bit of the $(X+b)^{th}$ data segment.

7. The method according to claim 4, wherein the number of bits comprised in the third data is $(X+b) \times M$, wherein high order $b \times M$ bits of the third data are equal to a first binary sequence, wherein the first binary sequence comprises b data segments, and a sequential order, in the first binary sequence, of the b data segments is the $(X+1)^{th}$ data segment to the $(X+b)^{th}$ data segment successively.

8. The method according to claim 4, wherein the Y data segments separately correspond to Y pieces of information, and the Y pieces of information are used to indicate that the Y data segments belong to the second Ethernet frame stream in the first clock cycle, and are used to indicate a location, in the second Ethernet frame stream, of each data segment in the Y data segments.

9. The method according to claim 8, wherein the distributing third data to a fourth calculation circuit specifically comprises:
   obtaining, according to the Y pieces of information, the second Ethernet frame stream from the received Ethernet frame streams in the first clock cycle, wherein the second Ethernet frame stream comprises the Y data segments; and
   distributing the second Ethernet frame stream to the fourth calculation circuit.

10. The method according to claim 1, wherein the X data segments separately correspond to X pieces of information, and wherein the X pieces of information are used to indicate that the X data segments belong to the first Ethernet frame stream in the first clock cycle, and are used to indicate a location, in the first Ethernet frame stream, of each data segment in the X data segments, and wherein the distributing first data to a first calculation circuit comprises:
   obtaining, according to the X pieces of information, the first Ethernet frame stream from the received Ethernet frame streams in the first clock cycle, wherein the first Ethernet frame stream comprises the X data segments; and
   distributing the first Ethernet frame stream to the first calculation circuit.

11. The method according to claim 10, wherein the first information to the $X^{th}$ information in the X pieces of information correspond to the first data segment to the $X^{th}$ data segment respectively, and the $X^{th}$ information is further used to indicate that the $X^{th}$ data segment is the last data segment in the first Ethernet frame stream, the method further comprising:
   saving a scrambling result of the first Ethernet frame stream in the first clock cycle according to the $X^{th}$ information.

12. An apparatus comprising a processor, X scrambling circuits, Y scrambling circuits, and a non-transitory computer readable medium storing instructions a program to be executed by the processor, the program including instructions for:
   receiving Ethernet frame streams in a first clock cycle;
   obtaining X data segments from the Ethernet frame streams in the first clock cycle, wherein the X data segments are data segments of a first Ethernet frame stream in the first clock cycle, wherein the number of bits of each data segment in the X data segments is M, wherein M is an integer greater than 1, and wherein X is a positive integer;
   obtaining Y data segments from the Ethernet frame streams in the first clock cycle, wherein the Y data segments are data segments of a second Ethernet frame stream in the first clock cycle, wherein the number of bits of each data segment in the Y data segments is M, and wherein Y is a positive integer;
   separately distributing X pieces of input data to the X scrambling circuits, wherein the X scrambling circuits are in a one-to-one correspondence with the X pieces of input data;
   separately distributing Y pieces of input data to the Y scrambling circuits, wherein the Y scrambling circuits are in a one-to-one correspondence with the Y pieces of input data;
   calculating concurrently, by the X scrambling circuits, scrambling results of the X data segments according to a scrambling polynomial and by separately using the X pieces of input data, wherein the X data segments are in a one-to-one correspondence with the X scrambling circuits, and wherein the instructions cause each scrambling circuit of the X scrambling circuits to calculate concurrently a scrambling result of a binary sequence in which the number of bits is M; and
   calculating concurrently, by the Y scrambling circuits, scrambling results of the Y data segments according to the scrambling polynomial and by separately using the Y pieces of input data, wherein the Y data segments are in a one-to-one correspondence with the Y scrambling circuits, and wherein the instructions cause each scrambling circuit of the Y scrambling circuits to calculate concurrently a scrambling result of a binary sequence in which the number of bits is M;
   wherein the X data segments comprise the first data segment to the $X^{th}$ data segment, and a sequential order of locations of the X data segments borne in the first Ethernet frame stream in the first clock cycle is the first data segment to the $X^{th}$ data segment successively,
   wherein the X scrambling circuits comprises an $a^{th}$ scrambling circuit, and the $a^{th}$ scrambling circuit is configured to calculate concurrently a scrambling result of an $a^{th}$ data segment according to the scrambling polynomial and by using an $a^{th}$ input data, wherein a value of a is an integer from 1 to X, and
   wherein the program further includes instructions for:
   distributing, by the processor, the $a^{th}$ input data to the $a^{th}$ scrambling circuit;
   distributing, by the processor, first data and second data to a first calculation circuit and a second calculation circuit respectively, wherein the $a^{th}$ input data comprises the first data and the second data, the $a^{th}$ scrambling circuit comprises the first calculation circuit, the second calculation circuit, and a third calculation circuit, wherein the first data comprises the first data segment to the $a^{th}$ data segment, wherein the second data comprises the last N bits in a scrambling result of a first Ethernet frame stream in a second clock cycle, wherein N is a degree of the scrambling polynomial, and wherein the second clock cycle is a clock cycle immediately before the first clock cycle;
   performing, by the first calculation circuit, an exclusive OR calculation on all related bits of each bit of the $a^{th}$ data segment in the first data, so as to obtain a first result of each bit of the $a^{th}$ data segment;
   performing, by the second calculation circuit, an exclusive OR calculation on all related bits of each bit of the $a^{th}$ data segment in the second data, so as to obtain a second result of each bit of the $a^{th}$ data segment; and
   performing, by the third calculation circuit, an exclusive OR calculation on the first result and the second result that are of each bit of the $a^{th}$ data segment, so as to obtain the scrambling result of each bit of the $a^{th}$ data segment.

13. The scrambling according to claim 12, wherein the Y data segments comprise the $(X+1)^{th}$ data segment to the $(X+Y)^{th}$ data segment, and a sequential order of locations of the Y data segments borne in the second Ethernet frame stream in the first clock cycle is the $(X+1)^{th}$ data segment to the $(X+Y)^{th}$ data segment successively,
- wherein the Y scrambling circuits comprises an $(X+b)^{th}$ scrambling circuit, and the $(X+b)^{th}$ scrambling circuit is configured to calculate concurrently a scrambling result of a $(X+b)^{th}$ data segment according to the scrambling polynomial and by using an $(X+b)^{th}$ input data, wherein a value of b is an integer from 1 to Y, and
- wherein the program further includes instructions for:
- distributing, by the processor, the $(X+b)^{th}$ input data to the $(X+b)^{th}$ scrambling circuit;
- distributing, by the processor, third data and fourth data to a fourth calculation circuit and a fifth calculation circuit respectively, wherein the $(X+b)^{th}$ input data comprises the third data and the fourth data, wherein the $(X+b)^{th}$ scrambling circuit comprises the fourth calculation circuit, the fifth calculation circuit, and a sixth calculation circuit, wherein the third data comprises the $(X+1)^{th}$ data segment to the $(X+b)^{th}$ data segment, and wherein the fourth data comprises the last N bits of a scrambling result of a second Ethernet frame stream in the second clock cycle;
- performing, by the fourth calculation circuit, an exclusive OR calculation on all related bits of each bit of the $(X+b)^{th}$ data segment in the third data, so as to obtain a first result of each bit of the $(X+b)^{th}$ data segment;
- performing, by the fifth calculation circuit, an exclusive OR calculation on all related bits of each bit of the $(X+b)^{th}$ data segment in the fourth data, so as to obtain a second result of each bit of the $(X+b)^{th}$ data segment; and
- performing, by the sixth calculation circuit, an exclusive OR calculation on the first result and the second result that are of each bit of the $(X+b)^{th}$ data segment, so as to obtain the scrambling result of each bit of the $(X+b)^{th}$ data segment.

14. The apparatus according to claim 13, wherein the number of bits comprised in the third data is $(X+b)\times M$, wherein high order $b\times M$ bits of the third data are equal to a first binary sequence, wherein the first binary sequence comprises b data segments, and a sequential order, in the first binary sequence, of the b data segments is the $(X+1)^{th}$ data segment to the $(X+b)^{th}$ data segment successively.

15. The apparatus according to claim 13, wherein the Y data segments are separately corresponding to Y pieces of information, and the Y pieces of information are used to indicate that the Y data segments belong to the second Ethernet frame stream, and are used to indicate a location, in the second Ethernet frame stream, of each data segment in the Y data segments, and
- wherein the program further includes instructions for:
- obtaining, according to the Y pieces of information, the second Ethernet frame stream from the received Ethernet frame streams in the first clock cycle, wherein the second Ethernet frame stream comprises the Y data segments; and
- distributing the second Ethernet frame stream to the fourth calculation circuit.

16. The apparatus according to claim 12, wherein the X data segments are separately corresponding to X pieces of information, and the X pieces of information are used to indicate that the X data segments belong to the first Ethernet frame stream, and are used to indicate a location, in the first Ethernet frame stream, of each data segment in the X data segments, and
- wherein the program further includes instructions for:
- obtaining, according to the X pieces of information, the first Ethernet frame stream from the received Ethernet frame streams in the first clock cycle, wherein the first Ethernet frame stream comprises the Y data segments; and
- distributing the first Ethernet frame stream to the first calculation circuit.

17. The apparatus according to claim 15, wherein the first information to the $X^{th}$ information in the X pieces of information are corresponding to the first data segment to the $X^{th}$ data segment respectively, and wherein the $X^{th}$ information is further used to indicate that the $X^{th}$ data segment is the last data segment in the first Ethernet frame stream, and
- wherein the program further includes instructions for saving a scrambling result of the first Ethernet frame stream in the first clock cycle according to the $X^{th}$ information.

* * * * *